A. F. BELL.
CLOTHES LINE ATTACHMENT.
APPLICATION FILED APR. 24, 1916.
1,208,080.
Patented Dec. 12, 1916.
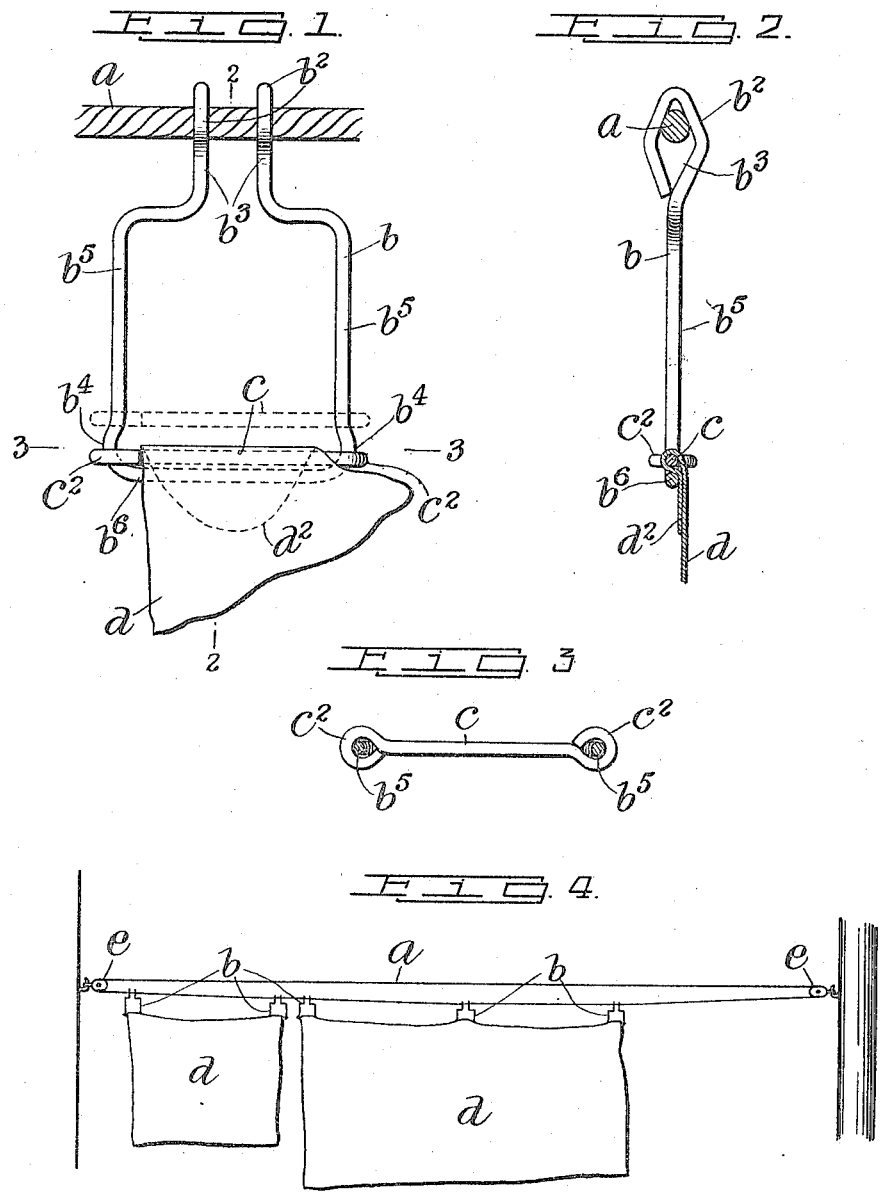
Inventor
Andrew F. Bell,
By his Attorneys

UNITED STATES PATENT OFFICE.

ANDREW F. BELL, OF STAPLETON, NEW YORK, ASSIGNOR OF ONE-SIXTH TO ERNEST C. HEIDLER, OF STAPLETON, NEW YORK.

CLOTHES-LINE ATTACHMENT.

1,208,080.

Specification of Letters Patent. Patented Dec. 12, 1916.

Application filed April 24, 1916. Serial No. 93,095.

*To all whom it may concern:*

Be it known that I, ANDREW F. BELL, a citizen of the United States, and residing at Stapleton, Staten Island, in the county of Richmond and State of New York, have invented certain new and useful Improvements in Clothes-Line Attachments, of which the following is a specification, such as will enable those skilled in the art to which it appertains to make and use the same.

This invention relates to clothesline attachments, and the object thereof is to provide an improved device or devices of this class which will take the place of ordinary clothespins and which will remain on the line when once applied thereto and be freely movable longitudinally thereof, and by means of which articles to be dried may be securely suspended from said line and may be quickly and easily connected therewith or detached therefrom.

The invention is fully disclosed in the following specification, of which the accompanying drawing forms a part, in which the separate parts of my improvement are designated by suitable reference characters in each of the views, and in which:—

Figure 1 is a side view showing one of my improved clothesline attachment and showing the method of its use; Fig. 2 a section on the line 2—2 of Fig. 1; Fig. 3 a section on the line 3—3 of Fig. 1; and, Fig. 4 a view indicating the method of using my improvement in connection with an endless line mounted on pulleys.

In the drawing forming part of this specification, I have shown at $a$ an ordinary clothesline and at $b$ one of my attachments. The attachment $b$ consists, in the form of construction shown, of a link-shaped body portion made of spring metal and approximately rectangular in form or provided with parallel side members and open at one end and provided with projecting shank members $b^2$ having rings or eyes $b^3$ through which the line $a$ is passed.

The sides of the end of the link-shaped body member are provided opposite the open end thereof with outwardly curved loop portions $b^4$, and mounted on the sides of the link-shaped body portion is a transverse link or bar member $c$ having end eyes or loops $c^2$ through which the sides $b^5$ of the link-shaped body portion pass.

In the use of devices of this class, the said devices are mounted on the line $a$, as indicated, and the articles $d$ to be dried, or a part $d^2$ thereof is passed over or around and beneath the part $c$ and between said part and the bottom $b^6$ of the link-shaped body portion, after which the part $c$ is forced downwardly into the position shown in full lines in Figs. 1 and 2, in which said part $c$ passes over and beneath the outwardly curved parts $b^3$ at the bottom of the sides of the link-shaped body portion and securely clamps the part $d^2$ of the article $d$ between the bottom $b^6$ of the link-shaped body portion of the device and said part $c$, as clearly indicated in Figs. 1 and 2, and in order to detach the article $d$, all that is necessary is to force the part $c$ of the attachment upwardly into the position indicated in dotted lines in Fig. 1.

In Fig. 4, I have shown the line $a$ as an endless line mounted on pulleys $e$, and it will be understood that in any use of my improved attachment or attachments for clotheslines, the rings or eyes $b^3$ may be permanently formed and the line passed therethrough, or said rings or eyes may be formed in the operation of connecting the attachment or attachments with the line, and while I have shown and described the preferred form of my improvement, the invention is not limited to the details thereof, as herein shown and described, and changes therein and modifications thereof may be made, within the scope of the appended claims, without departing from the spirit of my invention, or sacrificing its advantages.

It will be noted in Fig. 2 of the drawing that the rings or eyes $b^3$ are angular or diamond-shaped and the top and bottom portions form V-shaped recesses on the inner sides of said rings or eyes in which the rope $a$ operates and, in practice, the attachment $b$ when placed or moved to any desired point on the line $a$ is moved downwardly to force said rope within the top V-shaped recesses in the projecting shank members $b^2$ and if the article suspended from the attaching device is moved sidewise by wind or otherwise, the tendency would be to slide the attachment $b$ longitudinally of the line, but this is overcome by reason of the fact that the line $a$, if such movement of the attachment should occur, would be clamped between the top V-shaped recess in one of the projecting shank members $b^2$ and the bottom V-shaped recess of the other projecting shank member $b^2$ and prevent the longitudinal movement of the attachment $b$ on the line.

The operation of moving the link or bar member into the position shown in full lines in Figs. 1 and 2 may be facilitated by grasping the side members $b^5$ of the attachment $b$ by the hand to draw the same together, after which the said side members may be forced outwardly to force the link or bar member $c$ downwardly but this is not absolutely necessary as said bar or link member may be forced into the position shown in full lines in said figure by hand, and it will also be understood that a number of the attachments $b$ may be connected with a line and by bringing the projecting shank members $b^2$ close together, as shown in Fig. 1, a large number of said attachments may be so placed without taking up a great amount of room on the line.

Having fully described my invention, what I claim as new and desire to secure by Letters Patent, is:—

1. An article of the class described, comprising a link-shaped body portion open at one end and provided with projecting members by means of which said article may be suspended from a line, the side portions of the article being provided adjacent to the closed end thereof with outwardly curved parts, and a transverse slide device mounted on the side portions of the attachment and movable longitudinally thereof.

2. A clothesline attachment, comprising a link-shaped body portion open at one end and provided with projecting members whereby it may be slidably suspended from the line, the side portions of the device being provided adjacent to the closed end thereof with outwardly curved parts, and a transverse slide device mounted on the side portions of the attachment and movable longitudinally thereof.

3. A line attachment of the class described comprising a link-shaped body portion adapted at one end to be slidably suspended from the line, and the sides of which are provided adjacent to the opposite end with outwardly curved portions, and a transverse slide device mounted on said sides and operating in connection with said outwardly curved portions and the adjacent end of the body portion to hold articles in connection with said attachments.

In testimony that I claim the foregoing as my invention I have signed my name in presence of the subscribing witnesses this 22nd day of April, 1916.

ANDREW F. BELL.

Witnesses:
C. E. MULREANY,
H. E. THOMPSON.

Copies of this patent may be obtained for five cents each, by addressing the "Commissioner of Patents, Washington, D. C."